US011598887B2

(12) United States Patent
Bae et al.

(10) Patent No.: US 11,598,887 B2
(45) Date of Patent: Mar. 7, 2023

(54) METHOD FOR MEASURING RADIOACTIVITY OF RADIOACTIVE WASTE

(71) Applicant: KOREA ATOMIC ENERGY RESEARCH INSTITUTE, Daejeon (KR)

(72) Inventors: Sang Eun Bae, Sejong-si (KR); Jung Hwan Park, Daejeon (KR); Jun Hyuck Kim, Daejeon (KR); Hwa Kyeung Jeong, Daejeon (KR); Byung Man Kang, Daejeon (KR); Tae Hong Park, Sejong-si (KR); Sang Ho Lim, Sejong-si (KR); Kun Ho Chung, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/209,373

(22) Filed: Mar. 23, 2021

(65) Prior Publication Data
US 2021/0302598 A1 Sep. 30, 2021

(30) Foreign Application Priority Data
Mar. 30, 2020 (KR) .......................... 10-2020-0038428

(51) Int. Cl.
*G01T 1/167* (2006.01)
*G01T 7/02* (2006.01)
(Continued)

(52) U.S. Cl.
CPC .......... *G01T 1/167* (2013.01); *B01J 20/0225* (2013.01); *G01T 1/204* (2013.01); *G01T 7/02* (2013.01); *G21F 9/12* (2013.01)

(58) Field of Classification Search
CPC .. G01T 1/167; G01T 1/204; G01T 7/02; B01J 20/0225; G21F 9/12
See application file for complete search history.

(56) References Cited

U.S. PATENT DOCUMENTS

| 8,097,164 B2* | 1/2012 | Bushart .................. B03C 1/015 376/310 |
| 11,213,799 B2* | 1/2022 | Sakuma .................. C02F 1/281 |

(Continued)

FOREIGN PATENT DOCUMENTS

| CN | 105664880 B | * 10/2018 | ............ B01J 20/262 |
| FR | 2738502 | 3/1997 | |

(Continued)

OTHER PUBLICATIONS

Tanaka et al.—JP 2011-200856 A—Google Patents English obtained Jun. 21, 2022 (Year: 2022).*

(Continued)

*Primary Examiner* — David P Porta
*Assistant Examiner* — Jeremy S Valentiner
(74) *Attorney, Agent, or Firm* — Lex IP Meister, PLLC

(57) ABSTRACT

The present invention relates to a method for measuring radioactivity of radioactive waste, the method comprising an adsorption step (A) of selectively adsorbing a radioactive substance comprising at least one from among radioactive iodine and radioactive cesium from radioactive waste containing radioactive substances on an adsorption member for adsorbing a radioactive substance, and a measurement step (B) of measuring radioactivity of the radioactive substance.

12 Claims, 13 Drawing Sheets

(51) Int. Cl.
  *B01J 20/02* (2006.01)
  *G01T 1/204* (2006.01)
  *G21F 9/12* (2006.01)

(56) References Cited

U.S. PATENT DOCUMENTS

| | | | |
|---|---|---|---|
| 2009/0120880 | A1 | 5/2009 | Bushart et al. |
| 2014/0037037 | A1* | 2/2014 | Ito .............................. G21F 9/12 376/306 |
| 2014/0042068 | A1* | 2/2014 | Namiki ................ B01J 20/3293 427/127 |
| 2019/0275573 | A1 | 9/2019 | Kim et al. |
| 2020/0061577 | A1 | 2/2020 | Kang et al. |

FOREIGN PATENT DOCUMENTS

| | | | |
|---|---|---|---|
| JP | 2000-162387 | | 6/2000 |
| JP | 2011200856 A * | 10/2011 | .............. B01J 20/22 |
| JP | 2012-250904 | | 12/2012 |
| JP | 2013-050438 | | 3/2013 |
| JP | 5221245 | | 6/2013 |
| JP | 2013-205142 | | 10/2013 |
| JP | 2014-085163 | | 5/2014 |
| JP | 2015-021856 | | 2/2015 |
| JP | 2015-117981 | | 6/2015 |
| JP | 2015-206775 | | 11/2015 |
| JP | 2020-008498 | | 1/2020 |
| JP | 2020-028879 | | 2/2020 |
| KR | 10-2000-0002713 | | 1/2000 |
| KR | 10-1305241 | | 9/2013 |
| KR | 10-2014-0045357 | | 4/2014 |
| KR | 10-1523312 | | 5/2015 |
| KR | 10-2017-0125597 | | 11/2017 |
| KR | 10-2018-0026903 | | 3/2018 |
| KR | 101876686 B2 * | 7/2018 | .............. B07B 1/00 |
| KR | 10-1964639 | | 8/2019 |
| WO | 2010-149982 | | 12/2010 |

OTHER PUBLICATIONS

Liao et al., "Simultaneous separation of iodide and cesium ions from dilute wastewater based on PPy/PTCF and NiHCF/PTCF electrodes using electrochemically switched ion exchange method", Jan. 2015, Separation and Purification Technology Journal, vol. 139, pp. 63-69 (Year: 2015).*
KIPO, Office Action of KR 10-2020-0038428 dated Jul. 29, 2021.
JPO, Office Action of JP 2021-057305 dated Mar. 28, 2022.
KIPO, Office Action of KR 10-2022-0038049 dated May 27, 2022.
INPI, Search Report & Written Opinion of the corresponding French patent application FR2103187 dated Aug. 26, 2022.

* cited by examiner

METHOD FOR MEASURING RADIOACTIVITY OF RADIOACTIVE WASTE

CROSS-REFERENCE TO RELATED APPLICATIONS

This application claims the benefit of Korean Patent Application No. 10-2020-0038428, filed on Mar. 30, 2020, in the Korean Intellectual Property Office, the disclosure of which is incorporated herein in its entirety by reference.

TECHNICAL FIELD

The present invention provides a method for measuring radioactivity of a radioactive substance in radioactive waste, and a selective pretreatment method for chemical analysis.

BACKGROUND ART

Radioactive iodine and/or radioactive cesium are included in radioactive waste containing nuclear fuel after use, and also, are/is a radionuclide which is prone to leakage in case of an accident at a nuclear power plant. When nuclear fuel at a nuclear power plant is damaged, soluble radioactive elements present inside the damaged nuclear fuel are dissolved into a primary system coolant. Among the soluble elements, radioactive iodine is present in various types, such as an isotope which has a short half-life of several hours to two months, as well as I-129 which has a long half-life of more than 10 million years. Radioactive cesium also has a long half-life of 30 years.

Therefore, a technique for removing radioactive iodine and radioactive cesium is very important. In addition, chemical analysis of radioactive iodine and radioactive cesium in waste is very important to dispose of waste containing radioactive iodine and radioactive cesium.

In general, a low energy gamma ray (X-ray emission) measurement method is used for chemical analysis of iodine. In addition, chemical analysis of I-129 may be performed through Liquid Scintillation Counter (LSC) beta measurement analysis. However, since iodine is volatile and there are various oxidation states and chemical species (organic iodine), there are difficulties in that it is not easy to separate iodine in radioactive waste or to perform pretreatment for chemical analysis.

DISCLOSURE OF THE INVENTION

Technical Problem

The present invention is to solve various problems including the foregoing problem and provides a method for measuring radioactivity of a radioactive substance in radioactive waste.

However, this is merely exemplary and does not limit the scope of the present invention.

Technical Solution

According to an aspect of the present invention, there is provided a method for measuring radioactivity of radioactive waste, the method comprising an adsorption step (A) of selectively adsorbing a radioactive substance including at least one from among radioactive iodine and radioactive cesium from radioactive waste containing radioactive substances on an adsorption member for a adsorbing radioactive substance, and a measurement step (B) of measuring radioactivity of the radioactive substance.

Advantageous Effects

According to a method for measuring radioactivity of radioactive waste in accordance with an embodiment of the present invention, there is an effect of improving radioactivity measurement efficiency without interference with the measurement.

In addition, in the present invention, a radioactive substance having a very low concentration is concentrated to be prepared as a highly concentrated sample, so that there is an effect of significantly lowering the minimum detectable activity of radioactive measurement of the radioactive substance.

However, the scope of the present invention is not limited by the effect.

MODE FOR CARRYING OUT THE INVENTION

Figure 1:
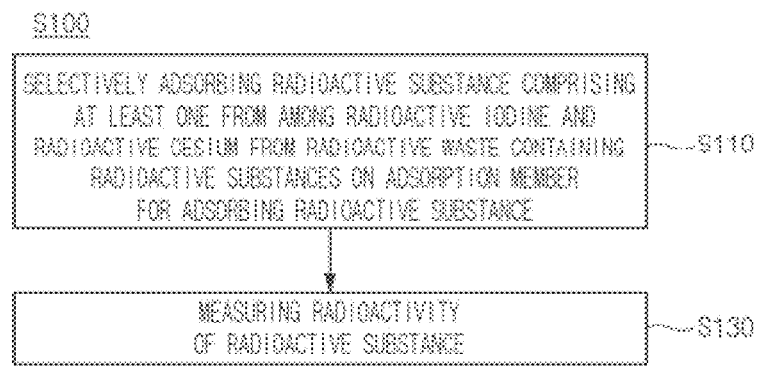
FIG. 1 is a flow chart showing a measurement method after pretreating radioactive waste according to an embodiment.

Hereinafter, an embodiment disclosed herein will be described in detail with reference to the accompanying drawings, but the same or similar elements will be given the same reference numbers regardless of the reference numerals, and redundant descriptions thereof will be omitted. In addition, in describing the embodiment disclosed herein, when it is determined that a detailed description of a related known technology may obscure the gist of the embodiment disclosed in this specification, the detailed description of the related known technology will be omitted.

In addition, it is to be understood that the accompanying drawings are only for facilitating understanding of the embodiment disclosed herein and should not be interpreted as limiting the technical spirit disclosed herein, and it is to be understood that all changes, equivalents, and alternatives falling within the spirit and scope of the present invention are intended to be included.

The terms of a singular form used herein may comprise plural forms unless the context clearly indicates otherwise.

Hereinafter, the present invention will be described in detail.

The present invention provides a method for measuring radioactivity of radioactive waste.

FIG. 1 is a flow chart schematically showing a method for measuring radioactivity of radioactive waste according to an embodiment of the present invention.

Referring to FIG. 1, a method for measuring radioactivity of radioactive waste S100 according to an embodiment of the present invention may comprise an adsorption step (A) of selectively adsorbing a radioactive substance S110 comprising at least one from among radioactive iodine and radioactive cesium from radioactive waste containing radioactive substances on an adsorption member for adsorbing a radioactive substance and a measurement step (B) of measuring radioactivity of the radioactive substance S130.

First, the adsorption step (A) of adsorbing a radioactive substance S110 using an adsorption member for adsorbing a radioactive substance may be allowing the adsorption member for adsorbing a radioactive substance to be in contact with radioactive waste containing radioactive substances, thereby selectively adsorbing a radioactive substance comprising a radioactivity measurement target material on the adsorption member.

The radioactive substance may comprise at least one selected from radioactive iodine and radioactive cesium.

The radioactive waste refers to waste comprising a radiation attenuation material, and is generally produced as a by-product in a nuclear reaction such as fission, but may be produced in industries not directly associated with the nuclear industry. The radioactive waste may be waste comprising various radioactive isotopes. Radioactive isotopes (radionuclides) may refer to elements in an unstable state which emit ionizing radiation while decaying, and thus, may be detrimental to humans and environments.

That is, the radioactive waste may refer to waste containing a radioactive substance comprising at least one selected from radioactive iodine and radioactive cesium.

The adsorption member for adsorbing a radioactive substance is a member capable of selectively adsorbing a radioactive substance included in the radioactive waste. The adsorption member comprises a substrate and an adsorbent, and the adsorbent may be mixed or dispersed in the substrate, or included or coated on the surface of at least a portion of the substrate. Accordingly, the adsorption member for adsorbing a radioactive substance may adsorb at least one selected from the radioactive iodine and the radioactive cesium.

A method known in the art may be used as a method for preparing the adsorption member for adsorbing a radioactive substance, that is a method for mixing or dispersing an adsorbent in the substrate, or as a method for forming (coating) an adsorbent on the surface of at least a portion of the substrate.

The adsorbent is a material capable of directly adsorbing the radioactive substance. The adsorbent may comprise, among elements belonging to the periodic table Group 8, Group 9, and Group 10, at least one selected from platinum group metals, meaning at least one selected from platinum (Pt), palladium (Pd), ruthenium (Ru), osmium (Os), rhodium (Rh), iridium (Ir), and an alloy thereof.

The adsorbent may comprise a platinum group metal selected from platinum (Pt), palladium (Pd), ruthenium (Ru), osmium (Os), rhodium (Rh), iridium (Ir), or an alloy thereof.

Alternatively, the adsorbent may include Prussian blue.

That is, the adsorbent may comprise at least one selected from the platinum group metal and the Prussian blue.

The adsorbent essentially comprises the platinum group metal, and may selectively comprise the Prussian blue.

When the adsorbent comprise at least one from among a platinum group metal and Prussian blue, as described above, a method known in the art may be used as a method for mixing or dispersing an adsorbent in the substrate, or as a method for forming (coating) an adsorbent on the surface of at least a portion of the substrate.

When the adsorbent comprises at least one platinum group metal and an alloy thereof, radioactive iodine may be selectively adsorbed. Among the above, it is preferable to use platinum (Pt) having high selectivity. When the adsorbent comprises Prussian blue, radioactive cesium may be selectively adsorbed. In addition, when the at least one platinum group metal and the Prussian blue are mixed and coated, radioactive iodine and radioactive cesium in radioactive waste may be simultaneously adsorbed.

Alternatively, the adsorbent may be used alone without a substrate. At this time, the adsorbent may comprise a planchet. When the adsorbent is used in a planchet form without a separate substrate, the adsorbent may be a planchet of a platinum group metal. That is, the adsorbent may comprise a planchet composed of a platinum group metal.

The substrate is a member for fixing the adsorbent, and may have various forms, such as a mesh, a nanoparticle, a porous surface, or a glass, but is not limited thereto.

The substrate may have at least one shape selected from a plate, a wire, a cylinder, and a sponge, but is not limited thereto.

The substrate in a mesh of various dimensions may be used as the substrate in a mesh depending on required conditions. The adsorbent may be included on the surface of the substrate in the form of a mesh. For example, the adsorbent may be mixed or dispersed, or coated.

In addition, the substrate may be in a nanoparticle. The particle size (radius or thickness) of the nanoparticle may be about 0.1 nm to about 500 nm. At this time, the substrate in the form of a nanoparticle may have at least one shape selected from a spherical shape, a distorted spherical shape, a hemispherical shape, a plate shape, and a needle shape, but is not limited thereto. The adsorbent may be included on the surface of the substrate in the form of a nanoparticle phase. For example, the adsorbent may be mixed or dispersed, or coated.

The substrate in a nanoparticle may be synthesized using a technique known in the art, such as hydrothermal synthesis, coprecipitation, or thermal decomposition. Depending on synthesis conditions, the shape and/or size of formed nanoparticles may be changed.

Alternatively, the substrate may comprise a planchet. When the substrate comprises a planchet, the substrate may use a planchet of various materials, shapes, and the like which do not affect radioactivity measurement.

The overall shape of the adsorption member for adsorbing a radioactive substance may be determined depending on the shape of the substrate. For example, when the plate-shaped substrate in the form of a mesh is used, the adsorption member may be a plate-shaped adsorption member in the form of a mesh, and when the substrate in the form of a nanoparticle is used, the adsorption member may be an adsorption member in a nanoparticle.

The substrate may comprise at least one selected from iron, magnetite, nickel, cobalt, a carbonaceous material, and an alloy thereof, or iron, magnetite, nickel, cobalt, a carbonaceous material, an oxide of an alloy thereof, and the like, but is not limited thereto. Alternatively, the substrate may comprise glass.

In addition, the substrate may be magnetic. The substrate in a mesh may be a magnetic substrate in a mesh, or the substrate in a nanoparticle may be a magnetic substrate in a nanoparticle.

For example, the substrate may comprise a magnetic metal, and specifically, may comprise a magnetic metal nanoparticle. The magnetic metal may comprise at least one selected from iron, nickel, and cobalt.

The substrate may comprise a carbonaceous material. The carbonaceous material is a concept including a carbon allotrope, and may comprise, for example, a carbon nanoparticle, a carbon fiber, a carbon nanotube, graphite, fullerene, graphene, and a mixture thereof, but is not limited thereto.

In addition, in order to selectively adsorb and separate the radioactive iodine, the substrate may comprise glass.

For example, the adsorption member for adsorbing a radioactive substance may comprise, on the surface of the substrate, a platinum group metal planchet with a platinum group metal coated thereon. Specifically, a platinum planchet in which platinum is coated on the surface of a glass disc may be included.

That is, the platinum group metal planchet may comprise a planchet in which a platinum group metal is coated on a glass substrate, or may comprise a planchet made of a platinum group metal.

The adsorption may is a concept comprising a phenomenon in which a radioactive substance contained in the radioactive waste is adhered on the surface of the adsorbent, and may be understood as a concept comprising physical adsorption, chemical adsorption, or electrochemical adsorption (electrostatic attraction, etc.) and the like.

The adsorption member for adsorbing a radioactive substance may comprise one which has been sintered at 50° C. to 900° C., and then washed with at least one solution selected from a piranha solution (which is mixed, for example, in a ratio of sulfuric acid:hydrogen peroxide=3:1), nitric acid, sulfuric acid, and hydrochloric acid to be dealloyed. Specifically, the adsorption member for adsorbing a radioactive substance may have been sintered at 200° C. to 900° C.

Before the adsorption member for adsorbing a radioactive substance is sintered, an adsorbent may be sparsely mixed or dispersed in at least a portion of a substrate of the adsorption member, or an adsorbent may be sparsely formed (coated) on the substrate. Thereafter, when the adsorption member for adsorbing a radioactive substance is sintered, the adsorbent mixed, dispersed, or formed on the substrate melts, agglomerates, and are crystallized, and thus, may be mixed, dispersed, or formed (coated) on most regions of the substrate.

Particularly, when the adsorption member for adsorbing a radioactive substance is sintered, there may be an additional effect of preventing the adsorbent from being detached from the substrate during a process of recycling the adsorbent.

Step (B) of measuring radioactivity of a radioactive substance S130 may comprise measuring radioactivity of the adsorption member with the radioactive substance adsorbed thereon.

Specifically, in Step (B), the adsorption member with the radioactive substance adsorbed thereon may be introduced into a radioactivity meter to measure radioactivity.

That is, measuring radioactivity of the radioactive substance adsorbed on the adsorption member may be included.

The radioactivity meter may comprise at least one selected from a low energy gamma ray meter, a liquid scintillation counter (LSC), and a gamma ray meter.

For example, when radioactivity is measured using a low energy gamma ray meter as the radioactivity meter, radioactivity may be measured while having the adsorption member with the radioactive substance adsorbed thereon disposed in the radioactivity meter. Particularly, in the case of measuring radioactivity using low energy gamma ray, there is an effect of measuring radioactivity with high efficiency without interference with the measurement such as self-absorption or self-attenuation which may occur in a radioactivity measurement method using AgI precipitation.

At this time, in order to measure radioactivity using the low energy gamma ray, an adsorption member comprising a substrate in a mesh, a substrate in a magnetic nanoparticle, or a platinum planchet may be used as the adsorption member for adsorbing a radioactive substance, but any adsorption member for adsorbing a radioactive substance described above may be used without limitation.

Figure 2:
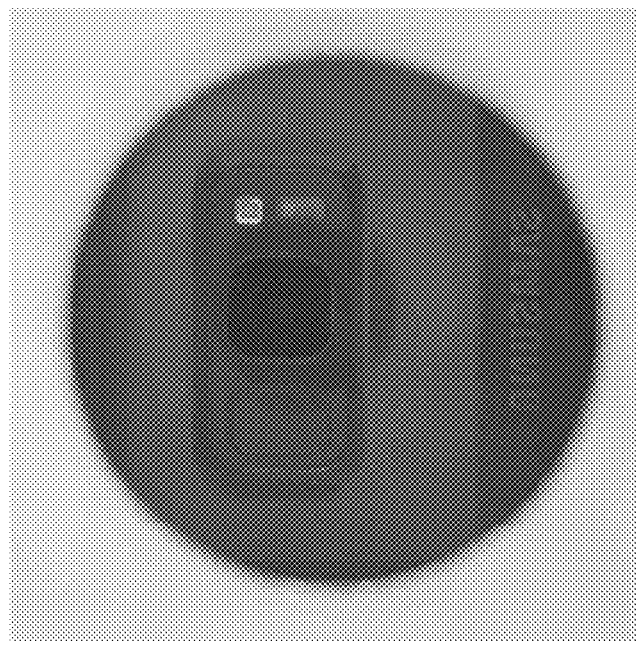
FIG. 2 is an image of a platinum planchet for measuring low energy gamma ray according to an embodiment.

FIG. 2 shows an image of a platinum planchet for measuring low energy gamma ray. The measurement of gamma ray may be performed by adsorbing iodine using a platinum planchet in which platinum is coated on a glass disc, and then introducing the platinum planchet with iodine adsorbed thereon into a low energy gamma ray meter.

Thereafter, the method for measuring radioactivity of radioactive waste may further comprise desorbing the radioactive substance from the adsorption member with the radioactive substance adsorbed thereon to recycle the adsorption member.

The desorption means that a radioactive substance is detached from the adsorption member with the radioactive substance adsorbed thereon, and may be understood as a concept comprising physical desorption, chemical desorption, or electrochemical desorption. For example, the desorption may comprise that an adsorbed radioactive substance is oxidized or reduced to be desorbed from the adsorption member, or the desorption may also comprise being finally dissociated and separated.

Specifically, in Step (B), after the radioactivity of the adsorption member with the radioactive substance adsorbed thereon is measured, a radioactive substance may be desorbed from the adsorption member with the radioactive substance adsorbed thereon to recycle the adsorption member with the radioactive substance desorbed therefrom, and the recycled adsorption member may be reused in the adsorption step (A).

A method for desorbing a radioactive substance from the adsorption member with the radioactive substance adsorbed thereon may comprise desorbing the radioactive substance by allowing the radioactive substance to electrochemically react by an electrochemical device 200 using the adsorption member with the radioactive substance adsorbed thereon as a working electrode.

Figure 3:
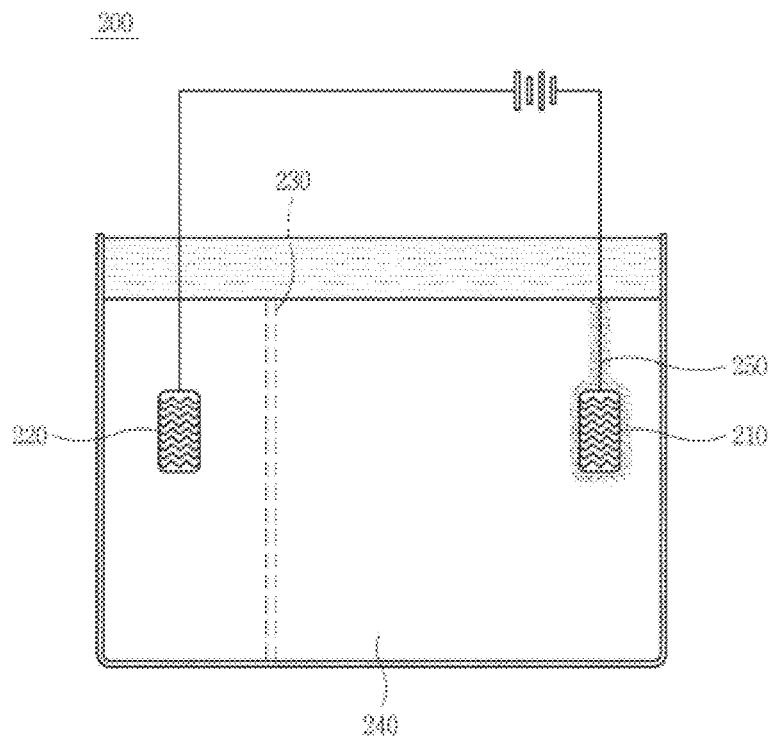
FIG. 3 is a schematic showing an electrochemical device for separating a radioactive substance from the adsorption member with the radioactive substance adsorbed thereon according to an embodiment.

FIG. 3 is a view schematically showing the electrochemical device 200 for desorbing a radioactive substance from an adsorption member with the radioactive substance adsorbed thereon according to an embodiment of the present invention. Referring to FIG. 3, the electrochemical device 200 is characterized by being a three electrode system in which a reference electrode (not shown), a counter electrode 220, and a working electrode 210 are immersed in an electrolyte 240.

In addition, the electrochemical device 200 may further comprise a separator 230. The separator 230 may serve to physically or chemically separate the counter electrode 220 and the reference electrode from the working electrode 210.

The shape, material and/or type of the separator 230 are not limited. As long as it can prevent the movement of a radioactive substance (for example, iodine ions or cesium ions) and the movement of impurities, any separator may be used without limitation.

At this time, when the electrochemical device 200 does not comprise the separator 230 therein, a radioactive substance 250 separated from the working electrode 210 may be introduced into and then adsorbed on the counter electrode 220 and the reference electrode, so that there may be a problem in which the counter electrode 220 and the reference electrode are contaminated with the radioactive substance. Therefore, the separator 230 is disposed between the counter electrode 220 and the reference electrode, and the working electrode 210 to physically or chemically separate two electrodes, and thus, may prevent a radioactive substance from moving and being introduced into and/or adsorbed on the counter electrode and the reference electrode.

That is, by using the electrochemical device 200, a radioactive substance is desorbed and separated from the adsorption member with the radioactive substance adsorbed thereon, and the adsorption member may be reused.

Alternatively, a method for desorbing a radioactive substance from the adsorption member with the radioactive substance adsorbed thereon may comprise desorbing the radioactive substance by immersing the adsorption member with the radioactive substance adsorbed thereon in a hydrogen peroxide aqueous solution.

At this time, the concentration of the hydrogen peroxide aqueous solution may be 0.1 mM to 0.1 M, and the hydrogen peroxide may serve as an oxidization agent or reduction agent to desorb the radioactive substance.

Among the radioactive substances, iodine may be desorbed under a basic condition, and among the radioactive substances, cesium may be desorbed under an acidic condition, so that the hydrogen peroxide aqueous solution may be used for the desorption of the radioactive substance by adjusting the acidity or basicity thereof.

Specifically, the adsorption member with the radioactive substance adsorbed thereon may be supported in the hydrogen peroxide aqueous solution to oxidize•reduce the radioactive substance from the adsorption member with the radioactive substance adsorbed thereon, thereby dissociating and desorbing the radioactive substance.

Alternatively, the measuring step (B) of measuring radioactivity of a radioactive substance S130 may comprise desorbing the radioactive substance from the adsorption member with the radioactive substance adsorbed thereon and measuring radioactivity of the desorbed radioactive substance.

The method for desorbing a radioactive substance may comprise desorbing the radioactive substance by allowing the radioactive substance to electrochemically react by the electrochemical device 200 using the adsorption member with the radioactive substance adsorbed thereon as a working electrode, or desorbing the radioactive substance by immersing the adsorption member with the radioactive substance adsorbed thereon in a hydrogen peroxide aqueous solution. As a detailed description of the method for desorbing a radioactive substance, the above-described desorption method may be applied in the same manner.

That is, as the method for desorbing a radioactive substance, the above-described method for desorbing or dissociating a radioactive substance using the electrochemical device 200 for recycling the adsorption member for adsorbing a radioactive substance may be applied in the same manner, or the above-described method for desorbing the radioactive substance by immersing the adsorption member for adsorbing a radioactive substance in the hydrogen peroxide aqueous solution may be applied in the same manner.

Before the measurement of radioactivity, through a step of desorbing a radioactive substance from the adsorption member for adsorbing a radioactive substance, the adsorption member with the radioactive substance desorbed therefrom may be recycled in the adsorption step (A) without a separate process of removing a radioactive substance.

In addition, a method for measuring radioactivity of a radioactive substance desorbed from an adsorption member for adsorbing a radioactive substance may comprise measuring radioactivity using the above-described radioactivity meter.

Specifically, an electrolyte containing the radioactive substance may be placed in a liquid scintillation counter (LSC) measurement sample unit (measurement cell) to perform LSC radioactivity measurement.

Specifically, the electrolyte containing the radioactive substance may be placed in a sample unit (measurement cell) of a liquid scintillation counter (LSC) to perform radioactivity measurement of the radioactive substance.

For example, when radioactivity is measured using a liquid scintillation counter (LSC) as the radioactivity meter, minimum detectable activity (MDA) may be greatly lowered, and the volume of radioactive waste may be reduced.

In addition, a step of analyzing a radioactive substance desorbed from the adsorption member for adsorbing a radioactive substance using at least one method selected from atomic emission spectrometry, atomic absorption spectrometry, and mass spectrometry may be further included.

The method for measuring radioactivity of a radioactive substance may further comprise a step of separating the adsorption member with the radioactive substance adsorbed thereon from the radioactive waste in Step (A).

As described above, a method for separating the adsorption member with the radioactive substance adsorbed thereon may comprise directly recovering the same from radioactive waste, or separating the same using a magnetic substrate.

For example, when the substrate is magnetic, the magnetic substrate may be allowed to come in contact with a bath in which radioactive waste containing the adsorption member for adsorbing a radioactive substance is contained, thereby separating the adsorption member with the radioactive substance adsorbed thereon.

When the substrate is not magnetic, the adsorption member with the radioactive substance adsorbed thereon may be directly recovered from a bath in which radioactive waste containing the adsorption member for adsorbing a radioactive substance is contained.

The magnetic substrate may be a substrate formed by sintering a magnetic body such as ferrite and an alloy, but is not limited thereto. Any magnetic substrate may be used without limitation. In addition, a method known in the art for removing magnetic properties of the magnetic substrate may be used as a method for separating the adsorption member for adsorbing a radioactive substance from the magnetic substrate.

The method for measuring radioactivity of a radioactive substance may further comprise, after the step of separating the adsorption member with the radioactive substance adsorbed thereon from the radioactive waste, a step of washing and/or drying the separated adsorption member with the radioactive substance adsorbed thereon.

Hereinafter, Experimental Examples provided to aid in understanding of the present invention will be described. However, the following Experimental Examples are merely illustrative of the present invention, and the present invention is not limited to the following Experimental Examples.

EXAMPLES

Example 1. Adsorption and Electrochemical Desorption of Iodine Using Platinum Electrode A platinum electrode with no iodine attached thereto was dipped in 0.1 M of $NaClO_4$ aqueous solution as an adsorption member, and glassy carbon as a counter electrode and a Ag|AgCl electrode as a reference electrode were dipped therein to configure an electrochemical 3 electrode cell. A linear sweep voltammetry experiment was performed at a scanning speed of 50 mV/s from 0 V to −0.9 V or less in the cell. The platinum electrode was taken out of the electrochemical cell, and was immersed into excess water (100 mL) in which 0.001 mM of iodine compound of KI, $I_2$, $CH_3I$ was dissolved, followed by stirring for 30 minutes. Thereafter, the platinum electrode was recovered and placed in the electrochemical cell to perform a linear sweep voltammetry experiment in the same environment. The results of the linear sweep voltammetry of the electrode in accordance with the adsorption of the iodine compound are shown in FIG. 4.

Figure 4:
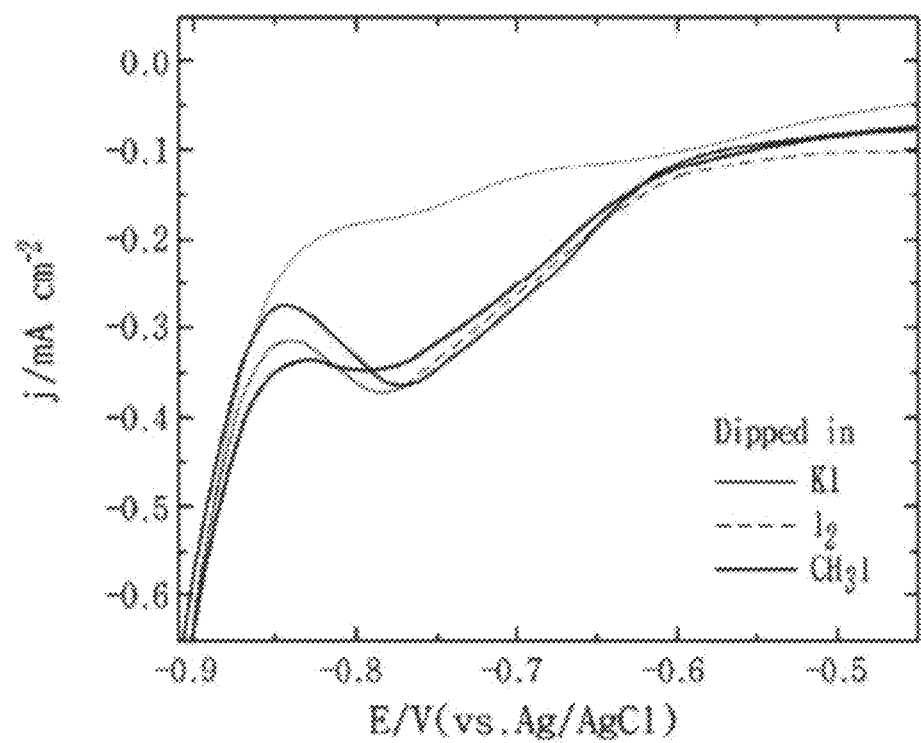
FIG. 4 is a graph showing linear sweep voltammetric results of electrodes in accordance with iodine compound adsorption according to Example 1 of the present invention.

Referring to FIG. 4, it can be confirmed that while a background level of current flows in the electrode not dipped in the iodine compound solution, a reduction current between −0.6 V and −0.85 V flows in the electrode with iodine adsorbed thereon. This is because the iodine adsorbed on the surface of the platinum electrode is dissociated into iodide ions through a reaction as shown in Reaction Formula 1, thereby allowing a current to flow. This means that when the iodine compound is adsorbed on the surface of the platinum electrode and a negative potential of −0.6 V or less is applied thereto, iodines are reduced and dissociated into an electrolyte.

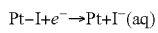

[Reaction Formula 1]

Example 2. Adsorption and Desorption of Iodine Using Adsorption Member in Sponge Shape To excess water (100 mL) in which 0.001 mM iodine ions ($I^-$) were dissolved, a platinum adsorption member in a sponge shape comprising a nickel substrate in a sponge shape with platinum coated thereon was added, followed by stirring for 30 minutes.

Thereafter, the platinum adsorption member in a sponge shape was recovered to construct an electrochemical system having the same as a working electrode as in Example 1. Then, a potential was applied to dissociate and recover iodine into a small amount of aqueous solution.

Figure 5:
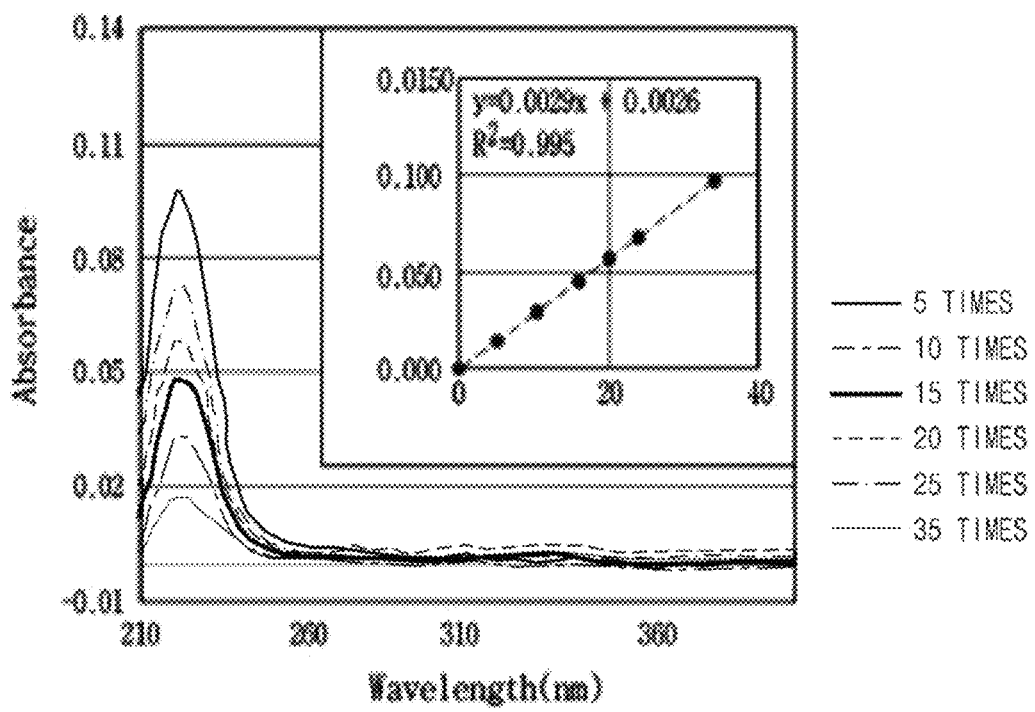
FIG. 5 is absorption spectroscopy spectra in accordance with iodine adsorption/desorption using an adsorption member in a platinum sponge shape according to Example 2 of the present invention.

Using the platinum adsorption member in a sponge shape, adsorption/desorption of iodine was performed several times, and using absorption spectroscopy and ICP-MS measured thereby, the concentration of iodine was measured and is shown in FIG. 5. In addition, the concentration of iodide in an aqueous solution in accordance with the adsorption/desorption frequency is shown in Table 1 below.

TABLE 1

| Adsorption/desorption frequency(number of times) | Iodide concentration (ppm) |
|---|---|
| 0 | 0.0 |
| 5 | 2.0 |
| 10 | 3.8 |
| 15 | 5.4 |
| 20 | 7.8 |
| 25 | 9.2 |
| 35 | 11.9 |

Referring to FIG. 5 and Table 1, from the results measured every time when iodine was recovered by repeating adsorption/desorption, it can be seen that an iodine absorption band near 220 nm constantly increased in proportion to the iodine adsorption/desorption frequency. It was also confirmed that inductively coupled plasma mass spectrometer (ICP-MS) concentration measurement values constantly increased in proportion to the iodine adsorption/desorption frequency. Through the above, it was confirmed that iodide ions, which is a radioactive substance contained in radioactive waste, was able to be concentrated to a high concentration by repeating adsorption/desorption for a number of times.

That is, by repeatedly performing the above adsorption/desorption process, many iodide ions may be transferred from a large container to a small container and concentrated, and also, iodine of a low concentration may be concentrated to a small volume to increase the concentration thereof, and be usefully used for a pretreatment method for iodine concentration analysis.

Example 3. Adsorption of Iodine Using Platinum Plate Planchet and Radiation Measurement Using Low Energy Gamma Ray Meter Radioactive iodine-129 was added in a small amount to a beaker having 50 ml of water, and 0.5 ml of sulfuric acid or nitric acid was added thereto. A platinum plate planchet (glass disc with platinum coated thereon) was placed in the beaker to adsorb radioactive iodine on the platinum plate planchet. Thereafter, the platinum plate planchet was recovered and washed with distilled water, and water was removed therefrom. Thereafter, the platinum plate planchet from which water was removed was disposed in a low energy gamma ray meter to measure radioactivity, and after the radioactivity measurement, an electrochemical device comprising a three electrode system having the platinum plate planchet as a working electrode, a glassy carbon as a counter electrode, and Ag|AgCl as a reference electrode was constructed.

At this time, the working electrode having a radioactive isotope thereon was separated from the counter electrode and the reference electrode using a glass film grid (e.g., porous glass or vycor glass, and the like) to prevent cross contamination of radioactive substances. It was able to desorb and separate the radioactive iodine-129 from the platinum plate planchet by applying −0.9 V to the working electrode.

The glass film grid is for preventing dissociated radioactive elements from moving from the working electrode to the counter electrode.

Table 2 shows radioactivity measurement efficiency according to Example 3.

TABLE 2

| Pretreatment | Net CPS | Activity (Bq) | Efficiency (%) |
| --- | --- | --- | --- |
| Pt—I | 0.490 | 3.33 | 26.79 |
| Ag—I | 0.183 | 2.39 | 13.90 |

Referring to Table 2, Pt—I was the radioactivity measurement efficiency by measuring low energy gamma ray after the adsorption of iodine using the platinum plate planchet for the radioactive iodine-129 according to Example 3 of the present invention, and the measurement efficiency (%) was confirmed to be 26.79%. In addition, in order to compare with the present invention, an experiment of measuring the low energy gamma ray of a powder, which was prepared by precipitating AgI by adding $AgNO_3$ in $I^-$ dissolved solution thereto using a typical AgI precipitation method, was also performed. As shown in Table 2, when low energy gamma ray was measured using the Ag—I precipitation method, the measurement efficiency was confirmed to be 13.90%.

That is, when radioactivity was measured after the adsorption of iodine using the platinum plate planchet, the measurement efficiency was confirmed to be increased by about 2 times compared to a method using a typical precipitation method. This is because the adsorption method using a typical precipitation method causes self-absorption or self-attenuation due to the AgI powder, but when iodine is adsorbed on the platinum plate planchet, the above phenomenon does not occur. Therefore, it can be seen that the measurement efficiency increased.

Additionally, by increasing the roughness of the surface of the platinum plate planchet, it was able to increase the adsorption amount of iodine.

Example 4. Adsorption of Iodine Using Adsorption Member in Mesh for Adsorbing Radioactive Substance and Radioactivity Measurement Using Liquid Scintillation Counter (LSC)

Figure 6:
FIG. 6 is an image of an LSC measurement cell including a platinum adsorption member in a cylindrical mesh with iodine-129 adsorbed thereon according to Example 4 of the present invention.

Radioactive iodine-129 ions were added in a small amount to a beaker having 100 ml of water, and 0.5 ml of sulfuric acid or nitric acid was added thereto. Thereafter, as shown in FIG. 6, a platinum adsorption member in a cylindrical mesh in which platinum is coated on the surface of a cylindrical iron mesh was placed in the beaker to adsorb the radioactive iodine. Thereafter, the adsorption member in a mesh coated with platinum was recovered, and then washed with distilled water for a number of times.

Figure 7:
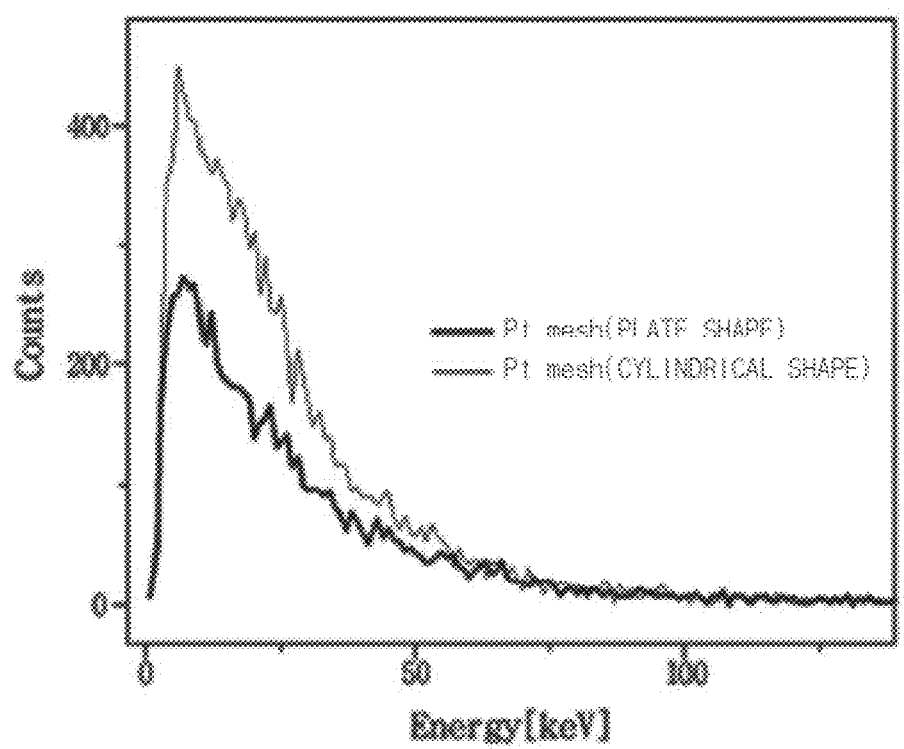
FIG. 7 is beta ray measurement spectra measured after adsorbing iodine-129 using a platinum adsorption member in a plate-shaped mesh and an adsorption member in a cylindrical mesh according to Example 4 of the present invention.

The adsorption member in a mesh washed with distilled water was placed in a liquid scintillation counter (LSC) sample unit (measurement cell) to perform radioactivity measurement, and beta ray radioactivity measurement spectrum results are shown in FIG. 7.

Referring to FIG. 7, radioactivity was measured using the LSC after adsorbing iodine-129 on the platinum adsorption member in a plate-shaped mesh and on the platinum adsorption member in a cylindrical mesh. When the platinum adsorption member in a cylindrical mesh was used, the intensity was 2 times or more than the one when the platinum adsorption member in a plate-shaped mesh was used. This may mean that when iodine of the same concentration per unit area is adsorbed, the surface area of the adsorption member in a cylindrical mesh is two times or more the surface area of the platinum adsorption member in a plate-shaped mesh, so that intensity is increased by two times or more when measuring beta ray measurement spectrum by the LSC.

Example 5. Adsorption of Iodine Using Adsorption Member in Nanoparticle for Adsorbing Radioactive Substance and Radioactivity Measurement Using Liquid Scintillation Counter (LSC)

Radioactive iodine-129 was added in a small amount to a beaker having 100 ml of water, and 0.5 ml of sulfuric acid or nitric acid was added thereto. A platinum adsorption member in a magnetic nanoparticle in which platinum is coated on the surface of magnetic iron nanoparticles was added to the beaker to adsorb the radioactive iodine. Thereafter, using a magnetic substrate, the platinum adsorption member in a magnetic nanoparticle was fixed, and then the solution was removed from the beaker. The adsorption member was washed with distilled water for a number of times. Thereafter, an electrochemical device having the platinum adsorption member in a magnetic nanoparticle as a working electrode was constructed, and a potential was applied thereto to desorb the radioactive iodine. Thereafter, a solution containing the desorbed radioactive iodine was placed in a liquid scintillation counter (LSC) sample unit (measurement cell) to perform radioactivity measurement.

Figure 8:
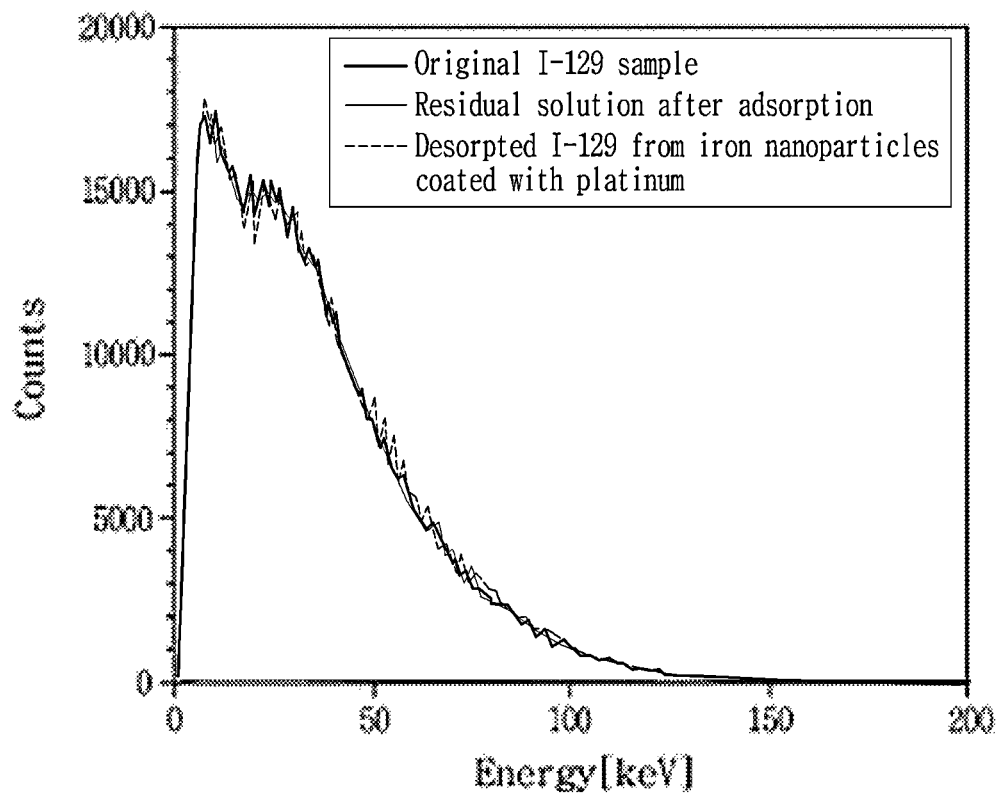
FIG. 8 is a radioactivity measurement graph before/after adsorption of iodine-129 using a platinum adsorption member in a magnetic nanoparticle according to Example 5 of the present invention.

The radioactivity measurement graph before/after the adsorption of iodine-129 using the platinum adsorption member in a magnetic nanoparticle is shown in FIG. 8.

Referring to FIG. 8, the LSC beta ray of initial radioactive iodine-129 was measured large, and a radioactivity measurement value of the beaker solution which was measured after adsorbing iodine-129 using the platinum adsorption member in a magnetic nanoparticle was shown to be at a background level (beta ray was rarely detected). In a solution after electrochemically desorbing iodine-129, the LSC beta ray of radioactive iodine-129 was confirmed to be measured again. That is, it was able to adsorb/desorb iodine-129 using the platinum adsorption member in a magnetic nanoparticle, and it was confirmed that beta ray measurement using the LSC was possible using the same.

Example 6. Pretreatment Using Platinum Adsorption Member in Cylindrical Mesh and Radioactivity Measurement Using Liquid Scintillation Counter (LSC)

In the same manner as in Example 4, a platinum adsorption member in a cylindrical mesh from which iodine-129 was desorbed was recovered, and then washed with distilled water a number of times. An electrochemical device having a platinum adsorption member in a cylindrical mesh with iodine-129 adsorbed thereon as a working electrode, a glassy carbon as a counter electrode, and Ag|AgCl as a reference electrode was constructed. At this time, the working electrode having a radioactive isotope thereon was separated from the counter electrode and the reference electrode using a glass film grid to prevent cross contamination of the radioactive iodine-129. Thereafter, −0.9 V was applied to the working electrode to desorb and then recover the radioactive iodine-129, and a solution containing the recovered radioactive iodine-129 was placed in a liquid scintillation counter sample unit (measurement cell) to perform radioactivity measurement.

As a result, similar to Example 5, the LSC beta radioactivity of initial radioactive iodine-129 was measured large, and a radioactivity measurement value of the beaker solution which was measured after adsorbing iodine-129 using the platinum adsorption member in a cylindrical mesh was shown to be at a background level. It was confirmed that the original value was measured after electrochemically desorbing the iodine 129. That is, it was able to adsorb/desorb iodine-129 using the platinum adsorption member in a cylindrical mesh, and it was confirmed that LSC beta ray measurement was possible using the same.

Example 7. Adsorption of Various Iodine Compounds on Platinum Surface

To each aqueous solution in which KI, $I_2$, $CH_3I$ are dissolved, iron nanoparticles coated with platinum were added to adsorb the iodine compound on the platinum surface. Thereafter, using a magnetic substrate, the iron nanoparticles were fixed, and then the solution was removed from a beaker. Then, the iron nanoparticles were washed with distilled water for a number of times. An electrochemical device having the iron nanoparticles coated with platinum as a working electrode was constructed, and a potential of −0.6 V or less was applied thereto to desorb and then recover the radioactive iodine. Thereafter, a solution containing the recovered radioactive iodine was measured by absorption spectroscopy to calculate the adsorption amount of iodine.

Figure 9:
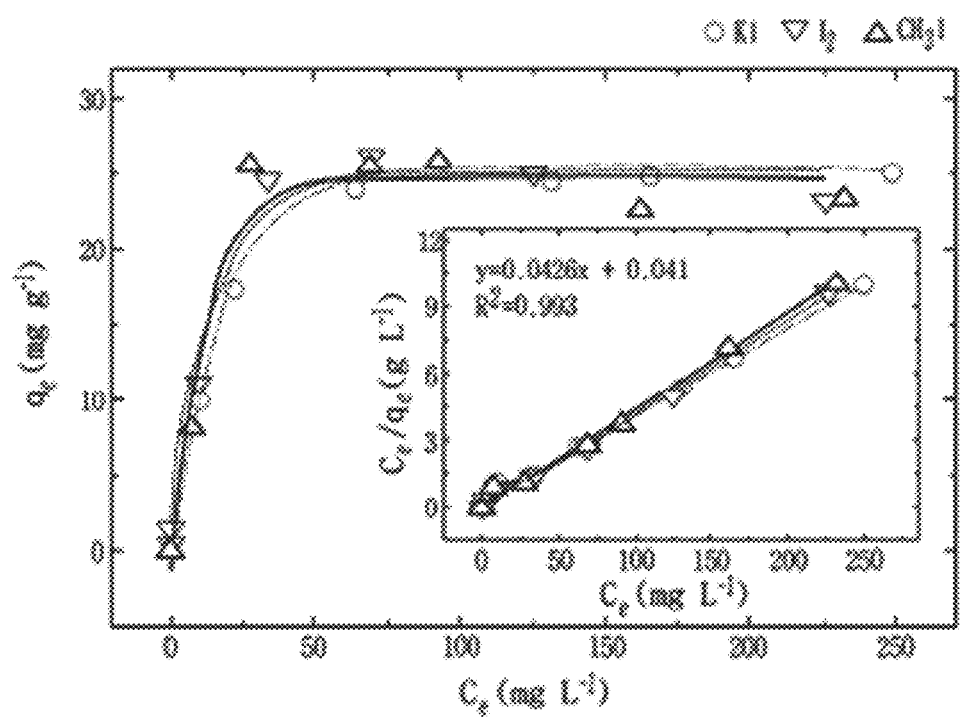
FIG. 9 is a graph showing an iodine adsorption isotherm in accordance with iodine compound adsorption of iron nanoparticles coated with platinum according to Example 7 of the present invention.

The adsorption isotherm of the iodine compound using the iron nanoparticles coated with platinum is shown in FIG. 9.

Through FIG. 9, it can be seen that iodine or an iodide ion, which is contained in an iodine compound by reacting the iodine compound of KI, $I_2$, and $CH_3I$ with the platinum surface, are adsorbed on the platinum surface. That is, it was confirmed that by adsorbing and desorbing $I^-$, $I_2$, and $CH_3I$ in the iodine compound using the platinum surface, it was able to separate $I^-$, $I_2$, and $CH_3I$.

Example 8. Adsorption of Iodine on Surface of Various Platinum Group Metal Nanoparticles To an aqueous solution in which KI is dissolved, iron nanoparticles coated with palladium (palladium adsorption member in a magnetic nanoparticle) were added to adsorb iodine on the palladium surface. Thereafter, using a magnetic substrate, the palladium coated nanoparticles were fixed, and then the solution was removed from a beaker. The palladium coated nanoparticles were washed with distilled water for a number of times. An electrochemical device having the iron nanoparticles coated with palladium as a working electrode was constructed, and a potential of −0.6 V or less was applied thereto to desorb radioactive iodine. Thereafter, a solution containing the desorbed radioactive iodine was measured by absorption spectroscopy to calculate the adsorption amount of iodine.

Figure 10:
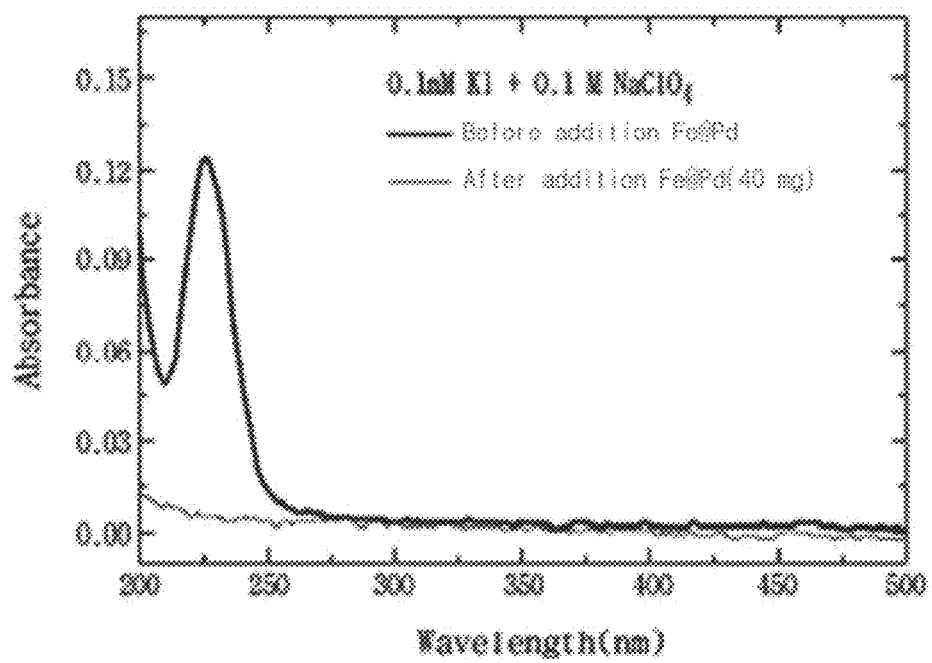
FIG. 10 is absorption spectroscopic spectra measured before/after iodine adsorption of iron nanoparticles coated with palladium according to Example 8 of the present invention.

The absorption spectra measured before and after the iodine adsorption of the iron nanoparticles coated with palladium are shown in FIG. 10.

Referring to FIG. 10, it was confirmed that when the iron nanoparticles coated with palladium were added, an iodine absorption band completely disappeared. That is, through the above, it was confirmed that it was able to separate the radioactive iodine by adsorbing and desorbing iodine on the palladium surface.

Example 9. Concentration of Cs Ions Using Prussian Blue

A carbon adsorption member comprising a glassy carbon substrate coated with nickel Prussian blue was dipped in an aqueous solution in which $CsNO_3$ was dissolved to construct a three-electrode electrochemical device as in Example 1. Thereafter, a potential of 0 V or less was applied thereto to adsorb $Cs^+$ ions on the carbon adsorption member coated with nickel Prussian blue. Thereafter, the carbon adsorption member was removed from an electrochemical cell, and then washed with distilled water for a number of times. Another three-electrode electrochemical device having the carbon adsorption member as a working electrode as in Example 1 was constructed, and then a potential of +0.5 V or greater was applied thereto to desorb $Cs^+$ into an electrolyte. The $Cs^+$ concentration of a solution containing the desorbed $Cs^+$ was measured using ICP-AES.

Figure 11:
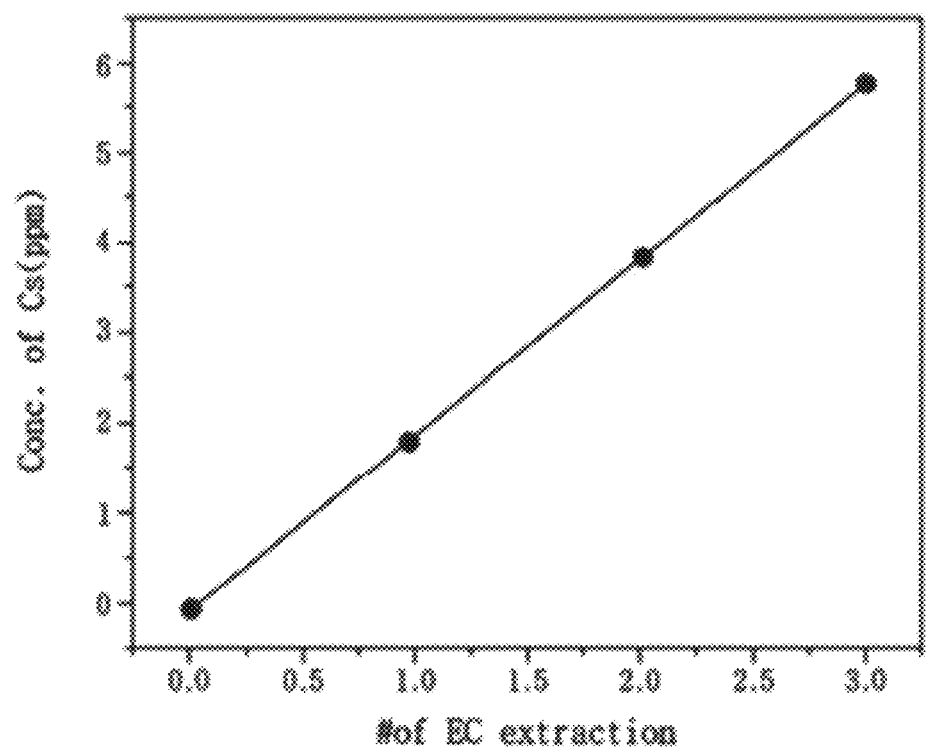
FIG. 11 is a graph of cesium concentration in accordance with adsorption/desorption number of cesium using a carbon adsorption member containing nickel Prussian blue according to Example 9 of the present invention.

The concentration graph of cesium in accordance with electrochemical adsorption/desorption of cesium using the carbon adsorption member comprising the carbon substrate coated with nickel Prussian blue is shown in FIG. 11.

Referring to FIG. 11, it was confirmed that by performing the adsorption/desorption process of $Cs^+$ for once, twice, and three times using the carbon adsorption member coated with nickel Prussian blue, the $Cs^+$ ions were transferred from a large container to a small container and concentrated, and also, $Cs^+$ ions of a low concentration were concentrated to a small volume. In addition, it was confirmed that by concentrating the $Cs^+$ ions, it may be able to usefully use the concentrated $Cs^+$ ions for a pretreatment method for $Cs^+$ ion concentration analysis or gamma ray measurement.

Example 10. Adsorption of Iodine Dissolved in Seawater

To seawater in which KI is dissolved, iron nanoparticles coated with platinum (platinum adsorption member in a magnetic nanoparticle) were added to adsorb iodine on the platinum surface. Thereafter, using a magnetic substrate, the iron nanoparticles coated with platinum were fixed, and then a solution was removed from a beaker. Then, the iron nanoparticles coated with platinum were washed with distilled water for a number of times. An electrochemical device having the iron nanoparticles coated with platinum as a working electrode was constructed, and a potential of −0.6 V or less was applied thereto to desorb radioactive iodine. Thereafter, the adsorption amount of iodine of a solution containing the desorbed radioactive iodine was measured using absorption spectroscopy. In addition, concentration of all ions dissolved in seawater before/after the iodine adsorption was measured using ICP-MS, GC, ICP-AES, and the like.

Figure 12:
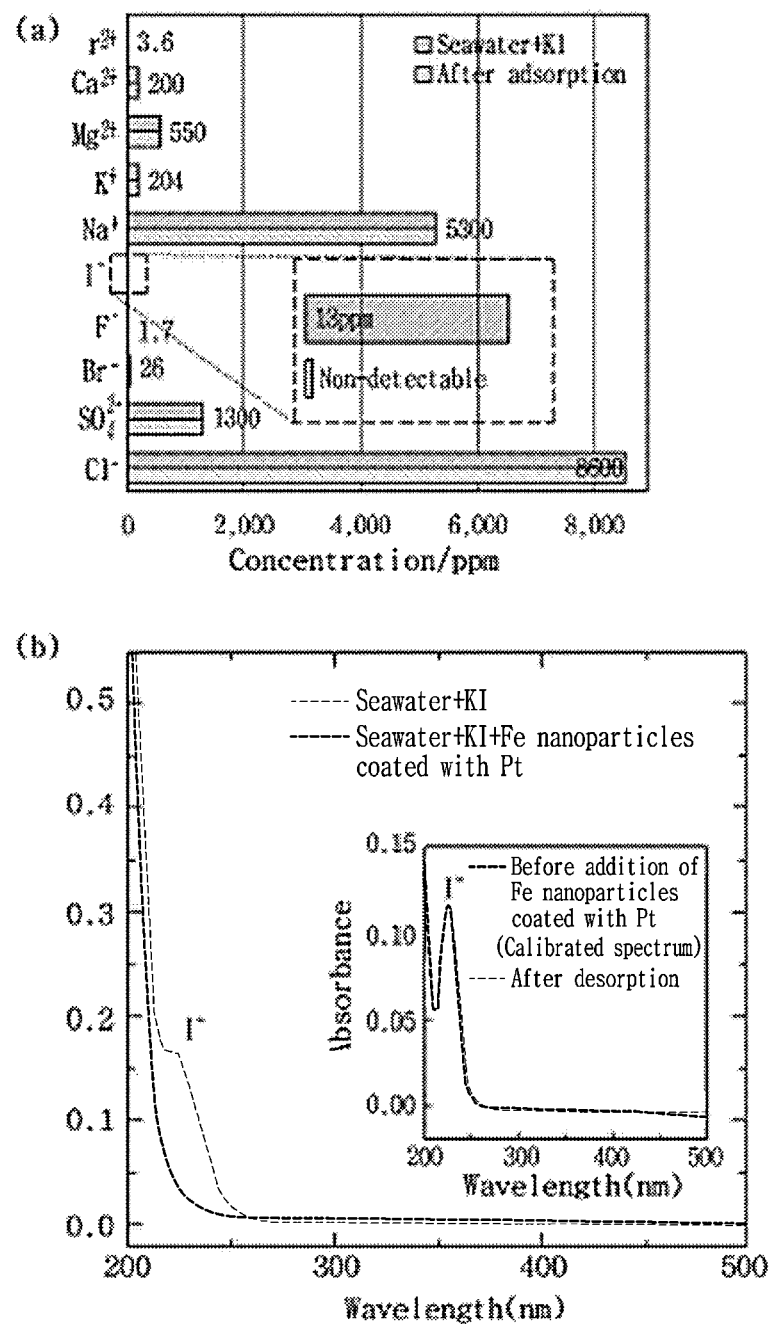
FIG. 12 (a) shows concentration of various ions in seawater before/after iodine ion adsorption, and FIG. 12 (b) is absorption spectra measured before/after iodine adsorption by adding iron nanoparticles coated with platinum to seawater according to Example 10 of the present invention.

FIG. 12 (a) shows concentration of various ions and iodine ions dissolved in seawater measured using ICP-MS, GC, ICP-AES, and the like, and FIG. 12 (b) is absorption spectroscopy spectrum measured before/after iodine adsorption by adding iron nanoparticles coated with platinum to seawater.

Referring to FIG. 12 (b), it was confirmed that when the iron nanoparticles coated with platinum were added, an iodine absorption band completely disappeared. Through the above, it was confirmed that iodine in seawater was also adsorbed on the platinum surface. In addition, through FIG. 12 (a), it was confirmed that only iodine was able to be selectively adsorbed from seawater.

Example 11. Iodine Adsorption According to pH of Aqueous Solution

To aqueous solutions of various pH in which KI was dissolved, an adsorption member comprising a substrate in a mesh coated with platinum (platinum adsorption member in mesh phase) was added to adsorb iodine on the platinum surface. Thereafter, the platinum adsorption member in a mesh phase was recovered from a beaker, and then washed with distilled water for a number of times. An electrochemical device having the platinum adsorption member in a mesh as a working electrode was constructed, and a potential of −0.6 V or less was applied thereto to recover radioactive iodine. Thereafter, the adsorption amount of iodine of a solution containing the recovered radioactive iodine was measured by absorption spectroscopy.

Figure 13:
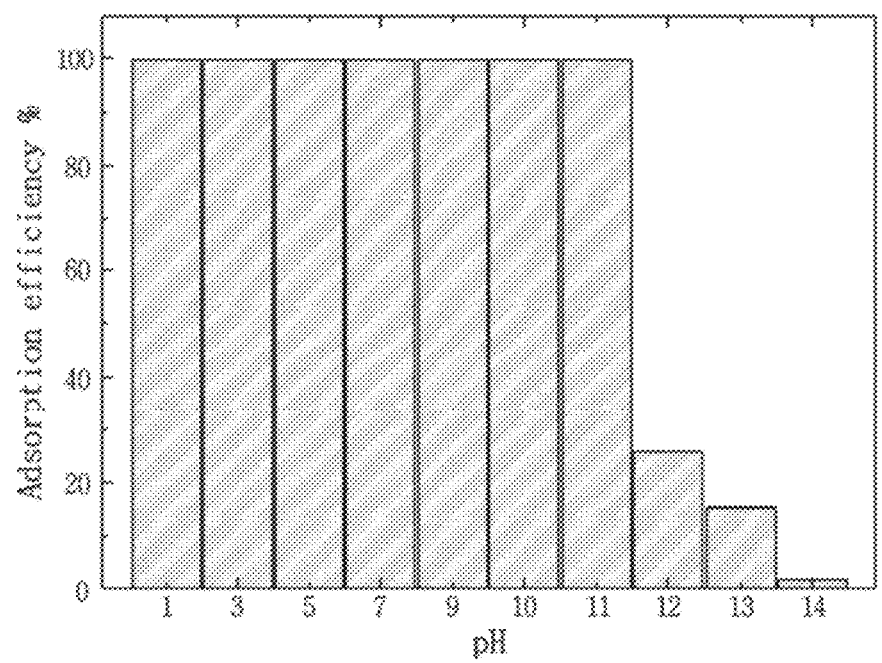
FIG. 13 is a graph showing adsorption efficiency of iodine adsorbed on a platinum adsorption member in a mesh in accordance with the pH of a KI aqueous solution according to Example 11 of the present invention.

A graph showing adsorption efficiency of iodine adsorbed on the platinum adsorption member in a mesh according to the pH of the aqueous solution is shown in FIG. 13.

Referring to FIG. 13, it can be confirmed that all aqueous solutions of pH 11 or lower exhibited 100% adsorption efficiency, and the adsorption efficiency of an aqueous solution of pH 12 or higher was rapidly decreased. That is, iodine adsorption of the adsorption member for adsorbing a radioactive substance according to the present invention is preferably performed at pH 11 or lower.

The invention claimed is:

1. A method for measuring radioactivity of radioactive waste, the method comprising:
   an adsorption step (A) of selectively adsorbing a radioactive substance comprising radioactive iodine from radioactive waste containing radioactive substances on an adsorption member for adsorbing a radioactive substance; and
   a measurement step (B) of measuring radioactivity of the radioactive substance after separating by desorption of the radioactive substance from the adsorption member with the radioactive substance adsorbed thereon,
   wherein the radioactive iodine comprises at least one selected from the group consisting of I−, $I_2$ and $CH_3I$,
   wherein the adsorption member comprises a substrate and an adsorbent for adsorption of the radioactive iodine, wherein the adsorbent is mixed or dispersed in the substrate, or included on the surface of at least a portion of the substrate,
   wherein the adsorbent for adsorption of the radioactive iodine comprises a platinum group metal comprising at least one selected from platinum (Pt), palladium (Pd), ruthenium (Ru), osmium (Os), rhodium (Rh), iridium (Ir), and an alloy thereof,
   wherein the desorbing of the radioactive substance comprises
   desorbing the radioactive substance by allowing the radioactive substance to electrochemically react by an electrochemical device using the adsorption member with the radioactive substance adsorbed thereon as a working electrode while applying a negative potential of −0.6 V or less.

2. The method of claim 1, wherein the Step (B) comprises further measuring radioactivity of the radioactive substance adsorbed on the adsorption member.

3. The method of claim 2, wherein the Step (B) comprises introducing the adsorption member with the radioactive substance adsorbed thereon into a radioactivity meter to measure radioactivity.

4. The method of claim 3, wherein the radioactivity meter comprises at least one selected from a low energy gamma ray meter, a liquid scintillation counter (LSC), and a gamma ray meter.

5. The method of claim 1, wherein the radioactive substance further comprises radioactive cesium, and wherein the adsorbent further comprises Prussian blue.

6. The method of claim 1, wherein the substrate has at least one form selected from a mesh, a nanoparticle, a porous surface, and a glassy phase; and
   wherein the substrate comprises at least one selected from iron, magnetite, nickel, cobalt, a carbonaceous material, an alloy thereof, an oxide thereof, and glass.

7. The method of claim 1, wherein the substrate comprises at least one shape selected from a plate, a wire, a cylinder, and a sponge.

8. The method of claim 1, wherein the Step (A) further comprises separating the adsorption member with the radioactive substance adsorbed thereon from the radioactive waste.

9. The method of claim 8, wherein the separating of the adsorption member is performed using a magnetic substrate.

10. The method of claim 1, wherein the desorbed radioactive substance is introduced into a sample unit of the radioactivity meter to measure radioactivity.

11. The method of claim 1, further comprising desorbing the radioactive substance from the adsorption member with the radioactive substance adsorbed thereon to recycle the adsorption member.

12. The method of claim 1, further comprising analyzing the desorbed radioactive substance using at least one method selected from atomic emission spectrometry, atomic absorption spectrometry, and mass spectrometry.

* * * * *